United States Patent [19]

Johnson

[11] 4,221,092
[45] Sep. 9, 1980

[54] SLEEVE

[75] Inventor: William L. Johnson, Mont Albert, Australia

[73] Assignee: ICI Australia Limited, Victoria, Australia

[21] Appl. No.: 733,852

[22] Filed: Oct. 19, 1976

[30] Foreign Application Priority Data

Nov. 4, 1975 [AU] Australia .............................. PC3837

[51] Int. Cl.² .......................... E04C 3/20; E04H 9/00
[52] U.S. Cl. .......................................... 52/232; 52/1;
52/309.7; 52/309.16
[58] Field of Search ................. 52/232, 1, 317, 309.7,
52/309.16; 106/15 FP; 252/8.1; 285/192, DIG.
26; 137/74; 428/920; 260/2.5 FP; 138/178, 103,
141

[56] References Cited

U.S. PATENT DOCUMENTS

| 2,550,560 | 4/1951 | Heron | 285/DIG. 26 |
| 3,145,811 | 8/1964 | Strehan et al. | 52/232 |
| 3,426,491 | 2/1969 | Gaeth et al. | 52/232 |
| 3,462,890 | 8/1969 | Blimenkranz | 52/1 |
| 3,504,615 | 4/1970 | Kurz | 137/74 |
| 3,543,460 | 12/1970 | Stastny et al. | 52/232 |
| 3,726,050 | 4/1973 | Wise et al. | 52/232 |
| 3,791,912 | 2/1974 | Allard | 52/309.7 |
| 3,904,111 | 9/1975 | Petersson | 138/178 X |
| 3,995,102 | 11/1976 | Kohaut | 52/232 |

FOREIGN PATENT DOCUMENTS

| 2154841 | 5/1973 | Fed. Rep. of Germany | 52/232 |
| 2162251 | 6/1973 | Fed. Rep. of Germany | 52/232 |
| 863195 | 3/1961 | United Kingdom | 285/192 |

Primary Examiner—Leslie Braun
Attorney, Agent, or Firm—Cushman, Darby & Cushman

[57] ABSTRACT

A fire barrier comprising an intumescent composition packed into the space between a thermoplastic pipe and an access hole or duct in a wall or floor through which the thermoplastic pipe is laid, said intumescent composition being characterized in that it will expand on heating to temperatures at which the thermoplastic pipe melts or burns, to form a fire resistant mass, said intumescent compound being present in sufficient amounts to completely fill the access hole or duct in its expanded state.

6 Claims, 2 Drawing Figures

SLEEVE

This invention relates to fire retardant walls and floors of buildings in particular it relates to a method of limiting fire from extending through walls or floors perforated for thermoplastic pipes.

Thermoplastic pipes are becoming increasingly used as cable, effluent water and other pipes and conduits in buildings. Furthermore, the provision of improved fire protection measures is also a feature of modern building design, and statutory regulations. In particular, where pipes and conduits pass through fire resistant walls and floors, the access hole or duct is a potential point where fire can extend to the adjacent room or the upper or lower floors in the case of multistorey buildings.

With many traditional pipe materials such as cast iron, steel, copper or earthenware, the resistance to fire is relatively great, due to high melting points and general refactory nature of the pipe materials. Thermoplastics however, melt or soften or decompose at relatively low temperatures, usually in the 100–600° C. range, and consequently the access holes provided in otherwise fire retardant walls and floors become exposed due to the melting and decomposition of the thermoplastic pipe previously occupying the space. When this occurs, hot gases, flames, and products of combustion can pass from one side of the fire resistant wall or floor to the other thus potentially extending the fire and contaminating the adjacent building spaces with unpleasant and dangerous smoke and products of combustion.

It is the purpose of this invention to provide a means whereby the access holes become at least temporarily closed to products of combustion after the thermoplastic pipe products have been burnt or melted away, thus eliminating the risk of spread of fire or combustion products to adjacent building spaces.

Accordingly we provide a fire barrier comprising an intumescent composition packed into the space between a thermoplastic pipe and an access hole or duct in a wall or floor through which the thermoplastic pipe is laid, said intumescent composition being characterised in that it will expand on heating to temperatures at which the thermoplastic pipe melts or burns, to form a fire resistant mass, said intumescent compound being present in sufficient amounts to completely fill the access hole or duct in its expanded state.

The space between the pipe and the walls of the duct or access hole must be sufficiently great to enable sufficient intumescent material to be packed around the pipe so that on expansion the duct or access hole is completely filled.

So as to fully understand the invention a preferred embodiment will now be described with reference to the diagrams in which.

Figure 1:
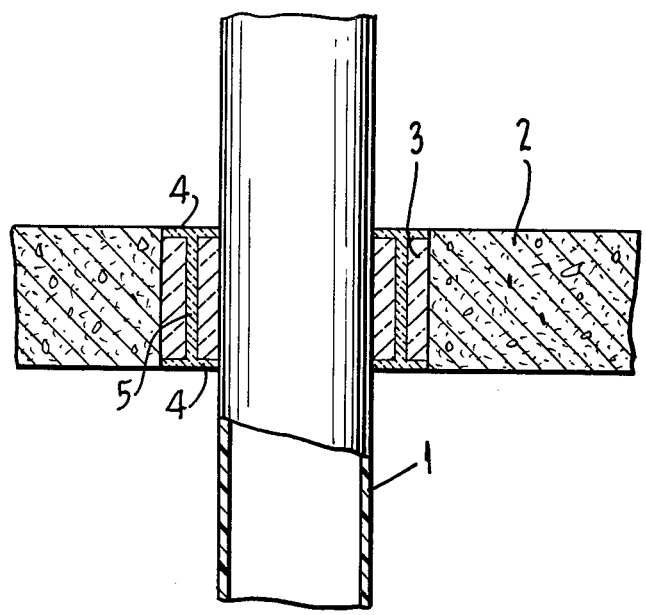
FIG. 1 shows a side view.
Figure 2:
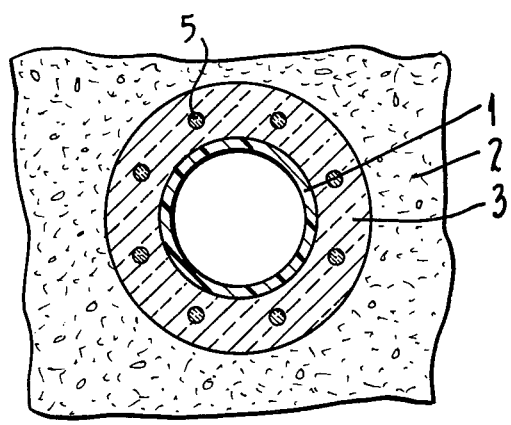
FIG. 2 shows a plan view of a pipe passing through an access hole in the fire resistant floor.

A thermoplastic pipe (1) passes through a fire resistant barrier (2), for example, a concrete floor of a multistorey building. The space between the pipe (1) and the barrier (2) is packed with intumescent material (3). The radius $r_2$ of the hole provided in the concrete floor is larger than the radius $r_1$ of the thermoplastic pipe (1) and the gap is entirely filled by a sleeve (3) constructed of an intumescent composition.

If the ratio of the volume of the sleeve (3) before heating to the volume after expansion is denoted by the symbol x, then the relation between the diameter of the pipe, $r_1$ the diameter of the hole $r_2$, and the expansion ratios of the sleeve x may be found by geometrical analysis.

The relation is $(r_2/r_1) = \sqrt{x/(x-1)}$ in the case where the sleeve is assumed to expand after heating so as to just fill the hole remaining in the fire resistant barrier after the thermoplastic pipe has been assumed to have been entirely destroyed.

Examples of the required annular sleeve dimension ratios for various sleeve compositions expansion ratios x are as follows:

| expansion ratio x | $\dfrac{\text{Hole radius } r_2}{\text{Pipe radius } r_1} = \dfrac{\text{sleeve OD}}{\text{sleeve ID}}$ |
| --- | --- |
| 2 | 1.73 |
| 3 | 1.22 |
| 4 | 1.15 |

Examples of the actual hole and sleeve diameters for commonly used pipe diameters are as follows:

| expansion ratio x | Hole diameter for sleeve diameter (inches) | | |
| --- | --- | --- | --- |
| | 2" | 3" | 4" |
| 2 | 3.5 | 5.2 | 6.9 |
| 3 | 2.4 | 3.7 | 4.9 |
| 4 | 2.3 | 3.5 | 4.6 |

Intumescent compositions with expansion ratio values in the range of x=2, 3, 4 are known within the present state of the art.

In an improved embodiment of our invention we provide a method of obtaining uniform foaming of the intumescent material. This improved embodiment comprises metallic heat conductors 5 embedded preferably axially in the intumescent material. The heat conductors 5 increase the heat conductivity through the intumescent material and hence prevents the initial foam produced at the hot face of the intumescent material from insulating the remaining intumescent material from the heat, and hence preventing full expansion.

In a further embodiment of our invention the intumescent material is held in place with a metal annular plate 4 attached to both ends of the annular sleeve. These metal plates decrease the tendency of the foam to expand axially and also increase the efficiency of the embedded metallic heat conductors by providing an additional heat collection area for the ends of the embedded conductors.

The nature of the embedded heat conductors is not critical, any increase in conductivity will aid the working of our invention. Preferably the heat conductors are extended metal objects placed lengthwise parallel to the axis of the sleeve in the body of the intumescent material.

The intumescent composition may be inorganic in nature. Compositions which on heating will give an inorganic foam are well known in the art. Such inorganic foams however have the disadvantages that the heat required to form the foam is far higher than the heat required to burn or melt the common thermoplastics.

The intumescent composition may also be organic in nature. It could include components consisting of thermoplastic polymers such as PVC, PE, or thermosetting resins such as urea or phenol formaldehyde, or elastomers of various types.

Intumescent compositions based on sugars are also well known in the art. These compounds have the advantage of being expanded at moderately low temperatures to give a fairly fire resistant cellulosic carbon foam.

Mixtures of organic and inorganic materials are also possible, such as the inclusion of fire retardant chemicals such as antimony trioxide, calcium carbonate, glasses and the like.

However, in all cases some method must be provided for ensuring expansion of the composition after exposure to a fire, but not during fabrication and normal service. This may be achieved by the addition of various chemical blowing agents which decompose to give gaseous products during heating, or may be a property of the decomposition of the basic components of the intumescent composition.

The precise composition chosen for a particular use will be dependent on many factors such as a need to withstand the fire temperatures for the time required by the fire rating of the fire resistant barrier itself, the need to design and manufacture the sleeves economically, the desirability that the sleeve be compatible with both barrier and pipe. For example if a PVC pipe is being used, it would be preferable but not vital for the expandable sleeve to be PVC compatible. For example this would enable the sleeve to be welded to the PVC pipe if this was desirable.

The space between the pipe and the access hole may be packed with intumescent material or with blocks of material. Preferably the intumescent material is shaped as a sleeve around the thermoplastic pipe.

Most preferably the sleeve is geometrically shaped so as to fulfill its purpose of isolating one building compartment from another. For example it might be desirable to design it with a taper to prevent it falling through a floor, or with a flange to provide an improved seal with the barrier. It could be fitted after the hole is provided but before the pipe is fitted, as cast in situ in the concrete in the case of concrete construction.

It could also be made in two split halves and fitted in the hole after the pipe is installed.

The invention is illustrated by, but by no means limited to, the following examples.

EXAMPLE 1

A PVC composition was made by mixing the following formulations on a two roll mill.

| Corvic 20 6013 PVC polymer | 100 | parts by weight |
|---|---|---|
| Tribasic lead sulfate | 3 | |
| Glyceryl mono stearate | 3 | |
| Calcium stearate | 1 | |
| Montan wax derivative | 1 | |
| Calcium Carbonate | 8 | |
| Antimony trioxide | 5 | |
| Azo dicarbonamide | 4 | |

The formula was premixed and compounded on a conventional 2 roll mill to form a sheet. The sheet was then chipped into granules which were fed to an extruder fitted with a ½" diameter pipe die. The resulting pipe was approximately ½" diameter with a 3/32" wall thickness.

The pipe was placed inside a ½" I.O. 4" long brass tube, and one end placed in the flame of a gas burner. After one hour the flame was removed and assembly allowed to cool. The contents of the brass tube was found to be a charred foamed rod with no trace of the original PVC pipe left.

After one hour the composition inside the 4" long brass tube which was subject to direct flame had burned away for a distance of ½" up the tube. The expansion ratio x of the compound was calculated as the ratio of the cross sectional area of the char to that of the original PVC pipe. The ratio x was found to equal 2.1.

EXAMPLE 2

Three samples of the composition prepared in Example 1 were weighed and their specific gravity measured. They were placed in a hot air oven at 350° C. for 2½ minutes. Expansion commenced after 1 minute, and after two minutes the samples were black and appeared fully expanded.

After measuring the weight and specific gravity it was found that the volumetric expansion ratio x was between 4.03 to 4.35.

EXAMPLE 3

An intumescent pipe was prepared by the procedure of Example 1 except that seven copper wires 2 mm diameter were pushed through the pipe at regular intervals. The intumescent pipe was placed through a hole in a concrete block of the same internal diameter as the external diameter of the intumescent pipe. A conventional PVC pipe was threaded through the hole in the intumescent pipe and the intumescent pipe held in place by means of two galvanised iron annular plates each being provided with a central hole of the same diameter as the external diameter of the conventional PVC pipe.

The flame of the gas burner was allowed to play on one of the annular plates for one hour. After cooling the concrete block was examined. No traces of the conventional PVC pipe could be seen on the heated side of the block and the space where the pipe had been was completely filled with charred foam. The PVC pipe on the unheated side of the block had melted and had been compressed by the foaming composition. The hole through the block was completely filled with foam.

I claim:

1. A fire barrier comprising an intumescent composition packed into the space between a thermoplastic pipe and an access hole or duct in a wall or floor through which the thermoplastic pipe is laid, said intumescent composition being characterised in that it will expand on heating to temperatures at which the thermoplastic pipe melts or burns, to form a fire resistant mass, said intumescent compound being present in sufficient amounts such that in its expanded state it will completely fill the access hole or duct which remains after the thermoplastic pipe has melted away or burned away.

2. A fire barrier as in claim 1 wherein metallic heat conductors are embedded in the intumescent composition.

3. A fire barrier as in claim 2 wherein the metallic heat conductors extend through the intumescent composition in a direction parallel to the axis of the access hole or duct.

4. A fire barrier as in claim 1 wherein the intumescent composition is held in place by means of an annular metallic plate fixed at each end of the composition in order to decrease the tendency of the intumescent composition to expand axially when heated.

5. A fire barrier as in claim 1 wherein the intumescent composition is in the form of a solid integral annular sleeve.

6. A fire barrier as in claim 1 wherein metallic heat conductors extend through the intumescent composition in a direction parallel to the axis of the access hole or duct and wherein the intumescent composition is held in place by an annular metallic plate fixed at each end of the composition in a manner to decrease the tendency of the composition to expand axially when heated and to provide a heat collection area for the ends of the conductors.

* * * * *